US012173799B2

(12) United States Patent
Hikone et al.

(10) Patent No.: US 12,173,799 B2
(45) Date of Patent: Dec. 24, 2024

(54) OIL CONTROL RING

(71) Applicant: TPR CO., LTD., Tokyo (JP)

(72) Inventors: Akira Hikone, Tokyo (JP); Takashi Oguro, Tokyo (JP); Noriaki Ayuzawa, Tokyo (JP); Toshihiro Yamaoka, Tokyo (JP); Naoki Umeda, Tokyo (JP)

(73) Assignee: TPR CO., LTD., Tokyo (JP)

( * ) Notice: Subject to any disclaimer, the term of this patent is extended or adjusted under 35 U.S.C. 154(b) by 0 days.

(21) Appl. No.: 18/548,166

(22) PCT Filed: Mar. 8, 2022

(86) PCT No.: PCT/JP2022/009918
§ 371 (c)(1),
(2) Date: Aug. 28, 2023

(87) PCT Pub. No.: WO2022/209621
PCT Pub. Date: Oct. 6, 2022

(65) Prior Publication Data
US 2024/0141993 A1    May 2, 2024

(30) Foreign Application Priority Data

Mar. 31, 2021    (JP) ................................. 2021-059855

(51) Int. Cl.
*F16J 9/20*    (2006.01)
*F16J 9/06*    (2006.01)

(52) U.S. Cl.
CPC .......... *F16J 9/20* (2013.01); *F16J 9/062* (2013.01)

(58) Field of Classification Search
CPC ...... F16J 9/20; F16J 9/062; F16J 9/203; F16J 9/206; F02F 5/00
See application file for complete search history.

(56) References Cited

U.S. PATENT DOCUMENTS

| | | | |
|---|---|---|---|
| 2006/0006604 A1* | 1/2006 | Abe ........................... | F16J 9/20 277/434 |
| 2006/0113730 A1* | 6/2006 | Suzuki ..................... | F16J 9/062 277/434 |

(Continued)

FOREIGN PATENT DOCUMENTS

| | | | | |
|---|---|---|---|---|
| DE | 112019004898 T5 | * | 6/2021 | ............... F16J 9/062 |
| JP | H-04132260 U | * | 12/1992 | |

(Continued)

OTHER PUBLICATIONS

Patent Cooperation Treaty, International Search Report, Application No. PCT/JP2022/009918, dated May 10, 2022, in 4 pages.

*Primary Examiner* — Grant Moubry
(74) *Attorney, Agent, or Firm* — PROCOPIO, CORY, HARGREAVES & SAVITCH LLP

(57) ABSTRACT

An oil control ring comprises: an oil ring having a pair of land parts arranged in a sliding direction and connected to each other by a web part; and a coil expander that biases the oil ring toward the outer circumferential side in the radial direction. The web part of the oil ring is provided with a plurality of window holes. In the axial cross-sectional view of the largest opening portion of the window hole in the axial direction of the oil ring, a width H1 in the sliding direction of the oil ring and a length L1 of a combustion chamber-side non-window hole part, which excludes the window hole, in the outer circumferential surface of the web part, satisfy the condition of $0.15 > L1/H1 \geq 0$.

5 Claims, 16 Drawing Sheets

(56) References Cited

U.S. PATENT DOCUMENTS

| | | | | |
|---|---|---|---|---|
| 2008/0122185 A1* | 5/2008 | Katou | ............... | F16J 9/18 |
| | | | | 277/434 |
| 2008/0169612 A1* | 7/2008 | Nanno | ............... | F16J 9/062 |
| | | | | 277/459 |
| 2010/0181731 A1* | 7/2010 | Ochiai | ............... | F16J 9/062 |
| | | | | 219/121.84 |
| 2013/0049305 A1 | 2/2013 | Miyamoto et al. | | |
| 2013/0181410 A1* | 7/2013 | Chiba | ............... | F16J 9/062 |
| | | | | 148/226 |

FOREIGN PATENT DOCUMENTS

| | | | | | |
|---|---|---|---|---|---|
| JP | 1994-201044 | A | | 8/1994 | |
| JP | 09159025 | A | * | 6/1997 | |
| JP | 2007092843 | A | * | 4/2007 | |
| JP | 2008-291991 | A | | 12/2008 | |
| JP | 2011-220519 | A | | 11/2011 | |
| JP | 5773500 | B | | 9/2015 | |
| WO | WO-2015151439 | A1 | * | 10/2015 | ............... F02F 5/00 |

\* cited by examiner (a)

| | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 | COMPARATIVE EXAMPLE 3 | BASE EXAMPLE |
|---|---|---|---|---|---|---|---|---|---|
| ENGINE OIL DISCHARGE CAPACITY | 1.9 | 1.4 | 1.2 | 1.1 | 1.1 | 1.0 | 1.0 | 0.9 | 1.0 |
| L1/H1 | 0.02 | 0.08 | 0.12 | 0.12 | 0.13 | 0.16 | 0.15 | 0.17 | 0.18 |
| (AC+BC)/AB | 1.04 | 1.23 | 1.47 | 1.25 | 1.35 | 1.60 | 1.41 | 1.38 | 1.49 |
| S1/S2 | 2.2% | 7.9% | 10.5% | 10.6% | 10.2% | 11.5% | 11.9% | 12.7% | 14.3% |
| L1×((AC+BC)/AB)×L4(mm²) | 0.01 | 0.24 | 0.48 | 0.40 | 0.46 | 0.76 | 0.62 | 0.70 | 0.71 |
| L1/L2 | 0.07 | 0.20 | 0.25 | 0.27 | 0.23 | 0.26 | 0.30 | 0.29 | 0.32 |
| L3/L2 | 1.00 | 0.61 | 0.51 | 0.46 | 0.55 | 0.49 | 0.40 | 0.42 | 0.36 |
| RADIAL AB ANGLE α(deg) | 20.0 | 23.2 | 31.6 | 26.9 | 23.1 | 30.5 | 33.6 | 27.3 | 27.8 |

OIL CONTROL RING

CROSS-REFERENCE TO RELATED APPLICATIONS

This application is US National Stage of International Patent Application PCT/JP2022/009918, filed Mar. 8, 2022, which claims benefit of priority from Japanese Patent Application JP2021-059855, filed Mar. 31, 2021, the contents of both of which are incorporated herein by reference.

TECHNICAL FIELD

The present invention relates to an oil control ring.

BACKGROUND ART

An oil control ring is mounted, as a piston ring, to a piston of an internal combustion engine. The oil control ring includes an oil ring and an expander that biases the oil ring outward in the radial direction (see Patent Document 1).

The oil ring has: land parts having a thickness in the radial direction and arranged at upper and lower sides in a sliding direction; and a web part having a smaller thickness than the land parts in the radial direction and connecting the upper and lower land parts. A plurality of window holes are formed along the circumferential direction of the web part, the window holes each extending through the web part in the radial direction.

During use of the oil control ring mounted to the piston, an engine oil is scraped off by the cylinder side (the outer circumferential side of the oil ring in the radial direction) of the upper and lower land parts of the oil ring, guided into a space (land space) between the upper and lower land parts, the web parts and the cylinder, and then discharged to the piston side (the inner circumferential side of the oil ring in the radial direction) through the window holes formed in the web part (see Patent Document 1).

CITATION LIST

Patent Document

Patent Document 1: JP5773500 B

SUMMARY

Technical Problem

In the above-described flow of the engine oil, the scraped engine oil sometimes stagnates in the cylinder-side land space of the oil ring. When deteriorated engine oil stagnates in the land space, an undissolved substance such as carbon sludge accumulates as deposits in the land space of the oil ring. When a large amount of deposits accumulates and clogs the window holes, the effect of discharging the engine oil is lowered, which impedes part of the engine oil from being discharged from an appropriate place, degrades the oil ring performance (oil scraping performance), and increases an amount of engine oil which remains unscraped. Furthermore, the unscraped engine oil will be released to the atmosphere with an exhaust gas due to combustion and vaporization. If these conditions are worsened, the oil control ring sticks to the piston and becomes unable to follow the cylinder.

As stated above, it is undesirable for the deposits to accumulate in the cylinder-side land space of the oil ring. However, factors that cause the engine oil to stagnate in the land space of the oil ring have not been sufficiently elucidated in the related art, and no techniques for reducing such deposits are known.

The present invention has been made in view of the above circumstances, and an object of the invention is to provide an oil control ring capable of inhibiting an engine oil from stagnating in a land space between upper and lower land parts and a web part on the cylinder side of the oil ring, and thereby inhibiting deposits from accumulating therein.

Solution to Problem

An oil control ring according to an aspect of the present invention comprises an oil ring having a pair of land parts arranged in a sliding direction and connected to each other by a web part; and a coil expander arranged on an inner circumferential side of the oil ring in a radial direction, the coil expander biasing the oil ring toward an outer circumferential side in the radial direction, wherein the web part of the oil ring is provided with a plurality of window holes along a circumferential direction, the window holes each extending through the web part in the radial direction; wherein, in an axial cross-sectional view of a largest opening portion in an axial direction of the window hole in the oil ring, an inner surface of a combustion chamber-side land part which is located on the outer circumferential side in the radial direction of the combustion chamber-side land part and connects an outer circumferential surface in the radial direction of the web part and a sliding surface of the land part, and an inner surface of a crank case-side land part which is located on the outer circumferential side in the radial direction of the crank case-side land part and connects the outer circumferential surface in the radial direction of the web part and a sliding surface of the land part, are formed so as to increase a diameter toward the outer circumferential side in the radial direction, and wherein, in the axial cross-sectional view of the largest opening portion of the window hole in the axial direction of the oil ring, a width H1 in the sliding direction of the oil ring and a length L1 of a combustion chamber-side non-window hole part, which excludes the window hole, in the outer circumferential surface of the web part, satisfy the following condition:

$0.15 > L1/H1 \geq 0$.

According to the aspect above, it is possible to inhibit the engine oil from stagnating in the cylinder-side land space of the oil ring and thereby inhibit deposits from accumulating, by configuring the width H1 of the oil ring and the length L1 of the non-window hole part so as to satisfy the condition of $0.15 > L1/H1$.

In the aspect above, in the axial cross-sectional view of the largest opening portion of the window hole in the axial direction of the oil ring, when a crank case-side end of the sliding surface of the combustion chamber-side land part is referred to as point A, a window hole-side end of the combustion chamber-side non-window hole part in the outer circumferential surface of the web part is referred to as point B, and an end of the combustion chamber-side non-window hole part, which is located on a side of the inner surface of the land part, in the outer circumference surface of the web part is referred to as point C, a distance AB between the points A and B, a distance AC between the points A and C, and a distance BC between the points B and C, may satisfy the following condition:

$1.0 \leq (\text{distance } AC + \text{distance } BC)/(\text{distance } AB) \leq 1.5$.

In the aspect above, in the axial cross-sectional view of the largest opening portion of the window hole in the axial direction of the oil ring, an area of a triangle formed by the points A, B and C is 11% or less and 0% or more of an area of a space formed by the pair of land parts and the web part on the outer circumferential side in the radial direction of the oil ring.

In the aspect above, in the axial cross-sectional view of the largest opening portion of the window hole in the axial direction of the oil ring, when a combustion chamber-side end of the sliding surface of the crank case-side land part is referred to as point A', (distance AC+distance BC)/(distance AB), the length L1 (mm) of the non-window hole part, and a distance L4 (mm) between the points A and A' of the land parts may satisfy the following condition:

0.6(mm$^2$)>$L1$×((distance $AC$+distance $BC$)/(distance $AB$))×$L4$.

In the aspect above, in the axial cross-sectional view of the largest opening portion of the window hole in the axial direction of the oil ring, a width L2 in the sliding direction of the web part and the length L1 of the non-window hole part may satisfy the following condition:

0.27≥$L1/L2$.

In the aspect above, in the axial cross-sectional view of the largest opening portion of the window hole in the axial direction of the oil ring, a width L2 in the sliding direction of the web part and a width L3 in the sliding direction of the window hole may satisfy the following condition:

$L3/L2$≥0.46.

In the aspect above, in the axial cross-sectional view of the largest opening portion of the window hole in the axial direction of the oil ring, an angle formed by a virtual line passing a crank case-side end of the sliding surface of the combustion chamber-side land part and the window hole-side end of the combustion chamber-side non-window hole part in the outer circumferential surface of the web part, with respect to the radial direction of the oil ring, may be 33 degrees or less.

In the aspect above, the non-window hole part may be a flat surface or a curved surface.

In the aspect above, in the axial cross-sectional view of the largest opening portion of the window hole in the axial direction of the oil ring, the non-window hole part may not exist, and the inner surface of the combustion chamber-side land part may be directly connected to a combustion chamber-side opening end of the window hole.

Advantageous Effects of Invention

According to the present invention, in the oil control ring, it is possible to inhibit engine oil from stagnating in the cylinder-side land space of the oil ring, and thereby inhibit deposits from accumulating therein.

BRIEF DESCRIPTION OF DRAWINGS

FIG. 9 is a table showing various dimensions and engine oil discharge capacity in the Examples, the Comparative Examples and a Base Example.

DESCRIPTION OF EMBODIMENTS

Figure 1:
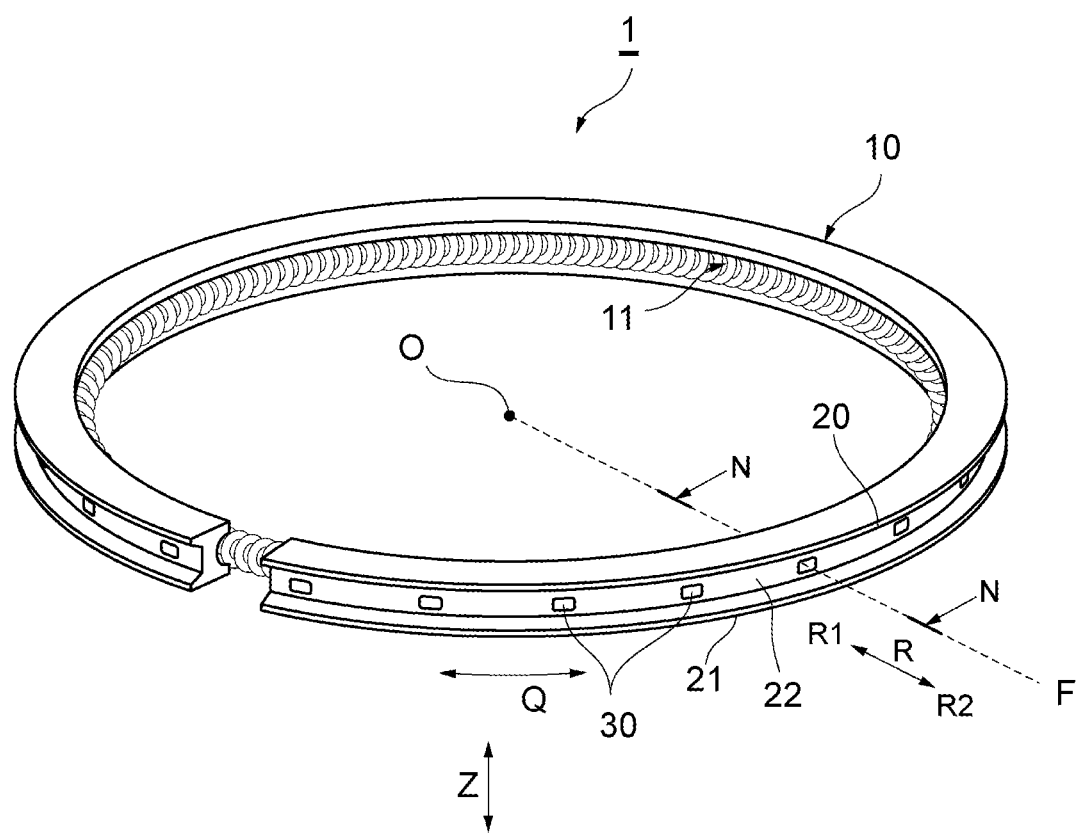
FIG. 1 is a perspective view showing an example of an oil control ring according to an embodiment.
Figure 2:
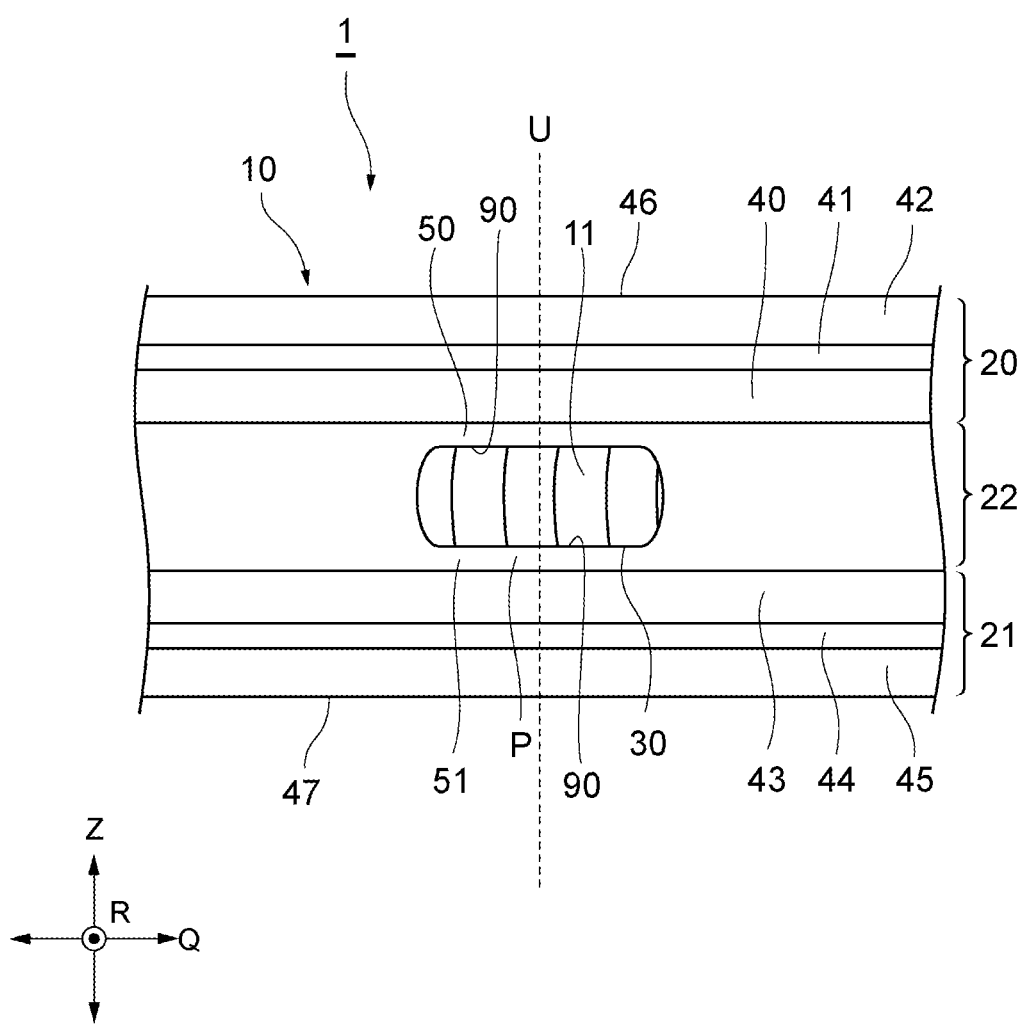
FIG. 2 is a partially-enlarged view showing a portion of an outer circumferential surface of the oil control ring.
Figure 3:
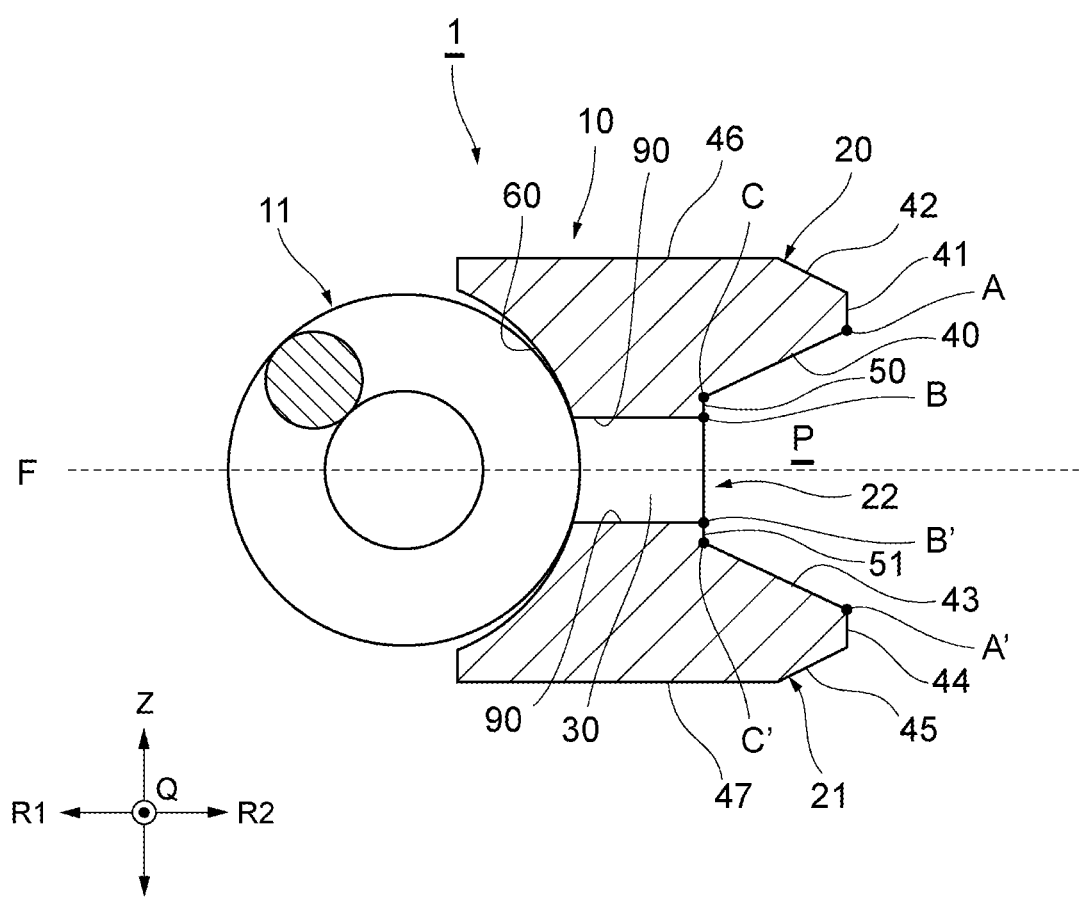
FIG. 3 is an axial cross-sectional view of a largest opening portion of a window hole in the axial direction of the oil control ring.

The following description will describe preferred embodiments of the present invention with reference to the attached drawings. FIG. 1 is a perspective view showing an example of an oil control ring 1 according to an embodiment. FIG. 2 is a partially-enlarged view showing a portion of an outer circumferential surface of the oil control ring 1. FIG. 3 is a cross-sectional view in the axial direction Z (hereinafter also referred to as "the axial cross-sectional view") showing the largest opening portion of a window hole in the axial direction of the oil control ring 1. The axial direction Z of the oil control ring 1 herein is also referred to as a sliding direction. In FIGS. 1-3, the upper side of the oil control ring 1 corresponds to the combustion chamber side in an internal combustion engine, whereas the lower side thereof corresponds to the crank case side in the internal combustion engine. The outer circumferential side in the radial direction R of the oil control ring 1 refers to a side farther from the center O in the radial direction R of the oil control ring 1 (the outer circumferential side R2), whereas the inner circumferential side in the radial direction R of the oil control ring 1 refers to the side closer to the center O in the radial direction R of the oil control ring 1 (the inner circumferential side R1).

As shown in FIG. 1, the oil control ring 1 includes a substantially annular oil ring 10 and a substantially annular coil expander 11 arranged on the inner circumferential side in the radial direction R of the oil ring 10. The shape of the oil control ring 1 may be, without limitation, circular, elliptic, etc.

As shown in FIGS. 1-3, the oil ring 10 includes a pair of substantially annular land parts 20, 21 arranged in the sliding direction Z, and a substantially annular web part 22 arranged between the pair of land parts 20, 21 so as to connect the land parts 20, 21 to each other.

The web part 22 is provided with window holes 30 that each extend through the web part 22 in the radial direction R. A plurality of window holes 30 are formed along the circumferential direction Q of the oil ring 10. The window holes 30 may be arranged, for example, at regular intervals.

As shown in FIG. 3, the oil ring 10 has a substantially "I"-like cross-sectional shape in the axial cross-sectional view of the oil ring 10. The cross-sectional view of FIG. 3 is an N-N cross-sectional view of FIG. 1, which is taken at a portion having the largest opening width in the axial direction Z of the window hole 30 shown in FIG. 2 (a central portion U in the circumferential direction of the window hole 30 in the present embodiment).

As shown in FIG. 3, the land parts 20, 21 each have a thickness in the radial direction R and protrude toward the outer circumferential side (outward direction R2) in the radial direction R with respect to the web part 22. The outer circumferential surface in the radial direction R of the combustion chamber-side (upper) land part 20 is provided with, for example, an inner surface 40, an outer circumferential sliding surface 41 and a chamfered surface 42. Similarly, the outer circumferential surface in the radial direction R of the crank case-side (lower) land part 21 is provided with, for example, an inner surface 43, an outer circumferential sliding surface 44 and a chamfered surface 45.

The inner surfaces 40, 43 of the respective land parts 20, 21 face the center line F passing through the center in the sliding direction Z of the oil ring 10 and extending toward the radial direction R. The inner surfaces 40, 43 of the pair of land parts 20, 21 are formed so as to increase the diameter toward the outer circumferential side R2 in the radial direction R. A distal end of the inner surface 40 of the upper land part 20 is connected to the outer circumferential sliding surface 41. The outer circumferential sliding surface 41 may be, for example, a flat surface formed so as to have the same diameter and extending in the sliding direction Z. The inner surface 40 of the upper land part 20 is connected to a lower end A of the outer circumferential sliding surface 41. The outer circumferential sliding surface 41 contacts and slides on, for example, an inner circumferential surface of a cylinder of the internal combustion engine during the use of the oil control ring 1. A distal end of the inner surface 43 of the lower land part 21 is connected to the outer circumferential sliding surface 44. The outer circumferential sliding surface 44 may be, for example, a flat surface formed so as to have the same diameter, and extends in the sliding direction Z. The inner surface 43 of the lower land part 21 is connected to an upper end A' of the outer circumferential sliding surface 44. The outer circumferential sliding surface 44 contacts and slides on, for example, the inner circumferential surface of the cylinder of the internal combustion engine during the use of the oil control ring 1.

The chamfered surface 42 of the upper land part 20 faces the upper side of the land part 20. The chamfered surface 42 is formed so as to decrease the diameter toward the inner circumferential side R1 in the radial direction R. The chamfered surface 42 is connected to an upper end of the outer circumferential sliding surface 41 and an upper surface 46 of the land part 20 (oil ring 10).

The chamfered surface 45 of the lower land part 21 faces the lower side of the land part 21 and is formed so as to decrease the diameter toward the inner circumferential side R1 in the radial direction R. The chamfered surface 45 is connected to a lower end of the outer circumferential sliding surface 44 and a lower surface 47 of the land part 21 (oil ring 10).

The web part 22 has a smaller thickness than those of the land parts 20, 21 in the radial direction R. The window hole 30 is arranged at the center in the sliding direction Z of the web part 22. An outer circumferential surface in the radial direction R of the web part 22 is provided with the window holes 30, a non-window hole part 50 on the combustion chamber side (upper side), and a non-window hole part 51 on the crank case side (lower side). The upper non-window hole part 50 is a portion, which excludes the window holes 30 and is located above the window hole 30, in the outer circumferential surface of the web part 22 and, for example, a lower end B of such non-window hole part 50 is connected to an upper opening end of the window hole 30, and an upper end C of the non-window hole part 50 is connected to an end (proximal end) of the inner surface 40 of the land part 20. The non-window hole part 50 may be, for example, a flat surface which extends in the sliding direction Z so as to have the same diameter. It should be noted that the non-window hole part 50 may not exist (the length thereof may be zero) and, in such case, the opening end B of the window hole 30 and the inner surface 40 of the land part 20 may be directly connected to each other.

The lower non-window hole part 51 is a portion, which excludes the window holes 30 and is located below the window hole 30, in the outer circumferential surface of the web part 22 and, for example, an upper end B' of such non-window hole part 51 is connected to a lower opening end of the window hole 30, and a lower end C' of the non-window hole part 51 is connected to an end (proximal end) of the inner surface 43 of the land part 21. The non-window hole part 51 may be, for example, a flat surface which extends in the sliding direction Z so as to have the same diameter. It should be noted that the non-window hole part 51 may not exist (the length thereof may be zero) and, in such case, the opening end B' of the window hole 30 and the inner surface 43 of the land part 21 may be directly connected to each other.

As stated above, the outer circumferential surface in the radial direction R of the oil ring 10 includes the combustion chamber-side non-window hole part 50, the inner surface 40, the outer circumferential sliding surface 41 and the chamfered surface 42, in the order of mention from the window hole 30 toward the upper surface 46. The outer circumferential surface in the radial direction R of the oil ring 10 includes the crank case-side non-window hole part 51, the inner surface 43, the outer circumferential sliding surface 44 and the chamfered surface 45, in the order of mention from the window hole 30 toward the lower surface 47. In the axial cross-sectional view of the oil ring 10, a land space P having a substantially trapezoidal shape is formed on the outer circumferential surface in the radial direction R of the oil ring 10, the land space P being surrounded by the inner surfaces 40, 43 of the pair of land parts 20, 21, and the outer circumferential surface of the web part 22. The land space P is formed along the circumferential direction Q so as to extend over the whole circumference of the oil ring 10.

An arcuate concave surface 60 in which the coil expander 11 can be fitted is formed in an inner circumferential surface on the inner circumferential side (inner circumferential side R1) in the radial direction R of the oil ring 10.

The coil expander 11 is formed of a spiral spring which is formed in a substantially annular shape, and the coil expander 11 is fitted in the concave surface 60 of the oil ring 10 to bias the oil ring 10 toward the outer circumferential side R2.

Figure 4:
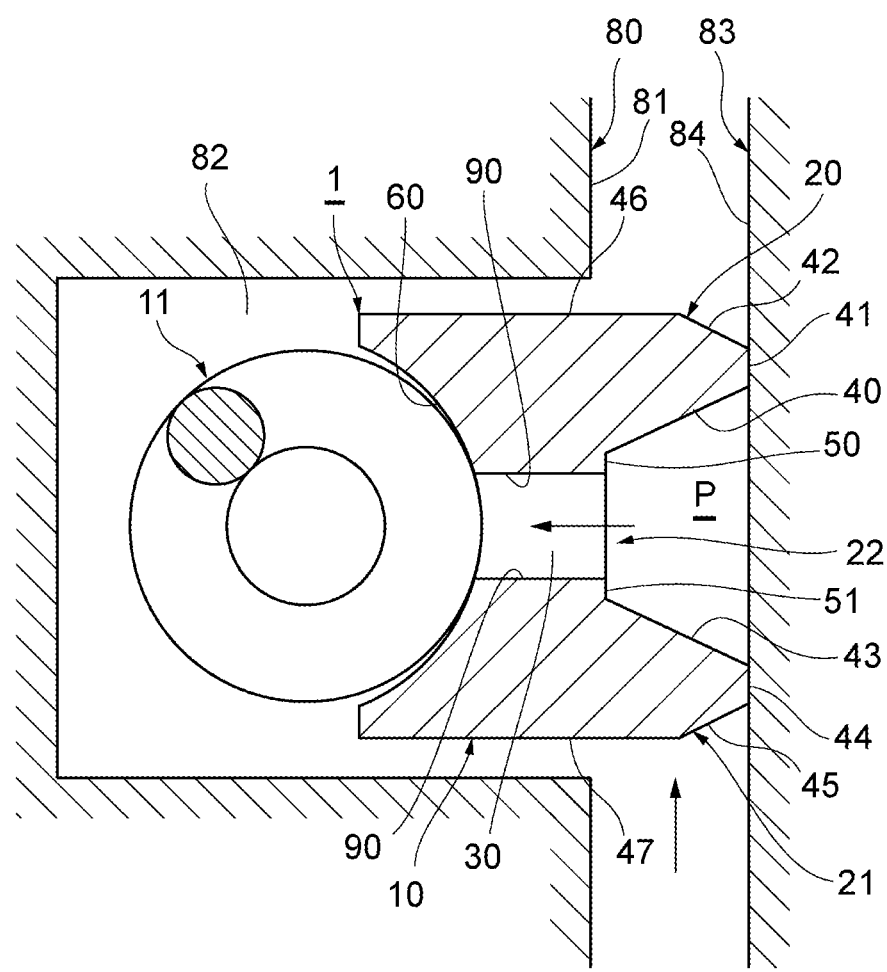
FIG. 4 is an axial cross-sectional view of the largest opening portion of the window hole in the axial direction of the oil control ring during use of an internal combustion engine.
Figure 4:
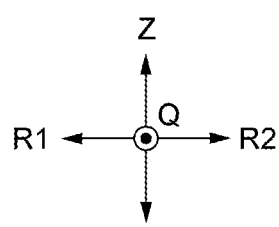

The oil control ring 1, when used in the internal combustion engine, is fitted in a ring groove 82 in an outer circumferential surface 81 of a piston 80 as shown in FIG. 4, so that the outer circumferential sliding surfaces 41, 44 of the oil ring 10 abut an inner circumferential surface 84 of a cylinder 83. When the piston 80 reciprocates in the cylinder 83, engine oil is scraped off by the crank case-side land part 21, and the engine oil which remains unscraped flows into the land space P. Further, the engine oil is scraped off by the combustion chamber-side land part 20, and the engine oil which remains unscraped flows into the land space P. The engine oil which has flown into the land space P is discharged through the window holes 30 to the rear surface side of the oil control ring 1, and then returned to the crank case side.

Figure 5:
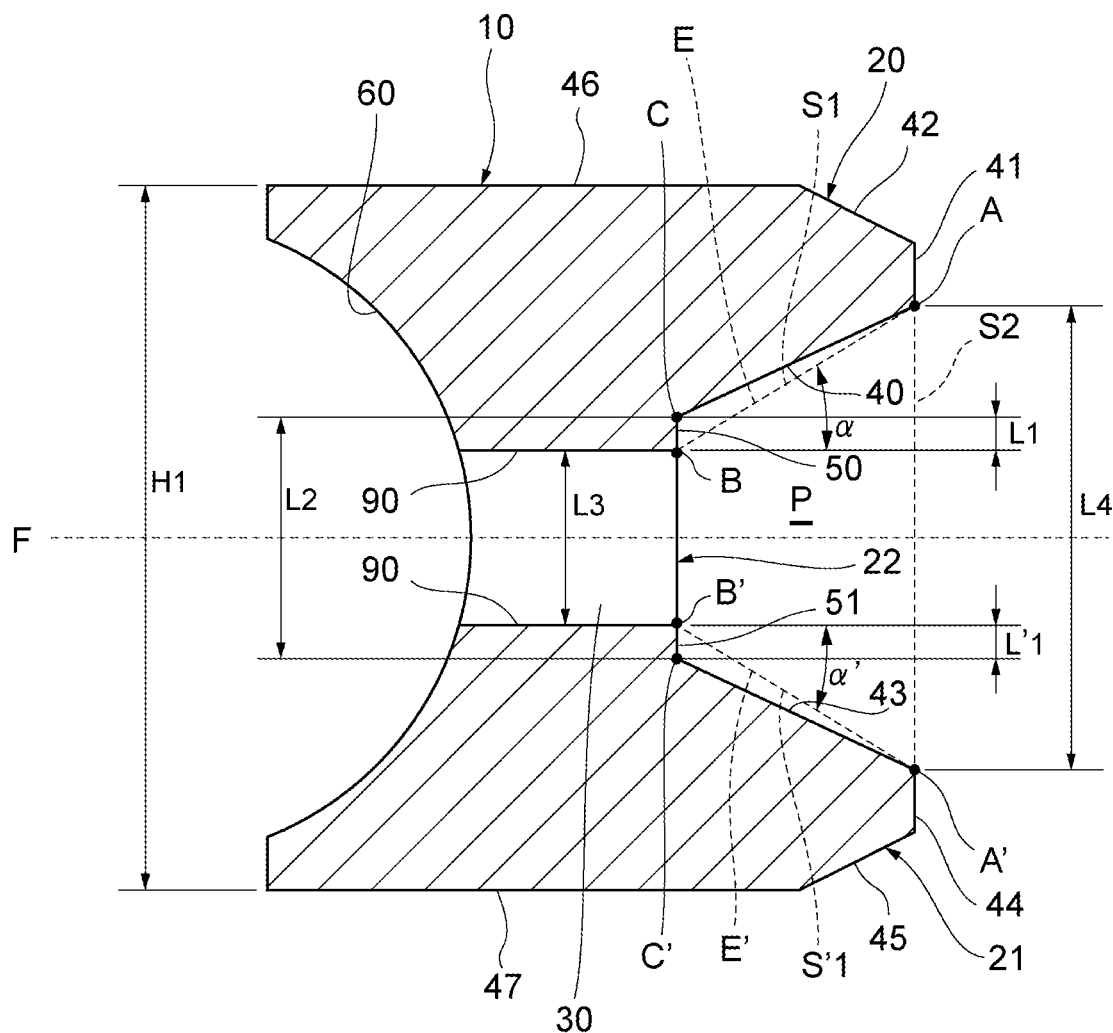
FIG. 5 is an illustration showing various dimensions of an oil ring in an axial cross-sectional view of the largest opening portion of the window hole in the axial direction of the oil control ring.
Figure 5:
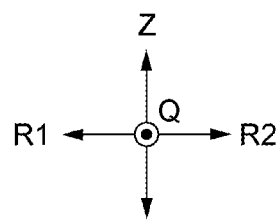

Here, various dimensions of the oil ring 10 will be described below. FIG. 5 is an axial cross-sectional view of the largest opening portion of the window hole in the axial direction Z in the oil ring 10, which illustrates the various dimensions of the oil ring 10.

A width H1 in the sliding direction Z of the oil ring 10 and a length L1 of the non-window hole part 50, excluding the window hole 30, in the outer circumferential surface of the web part 22, satisfy the following condition:

$$0.15 > L1/H1 \geq 0$$

The L1/H1 is preferably 0.10 or less, and more preferably 0.08 or less.

Figure 6:
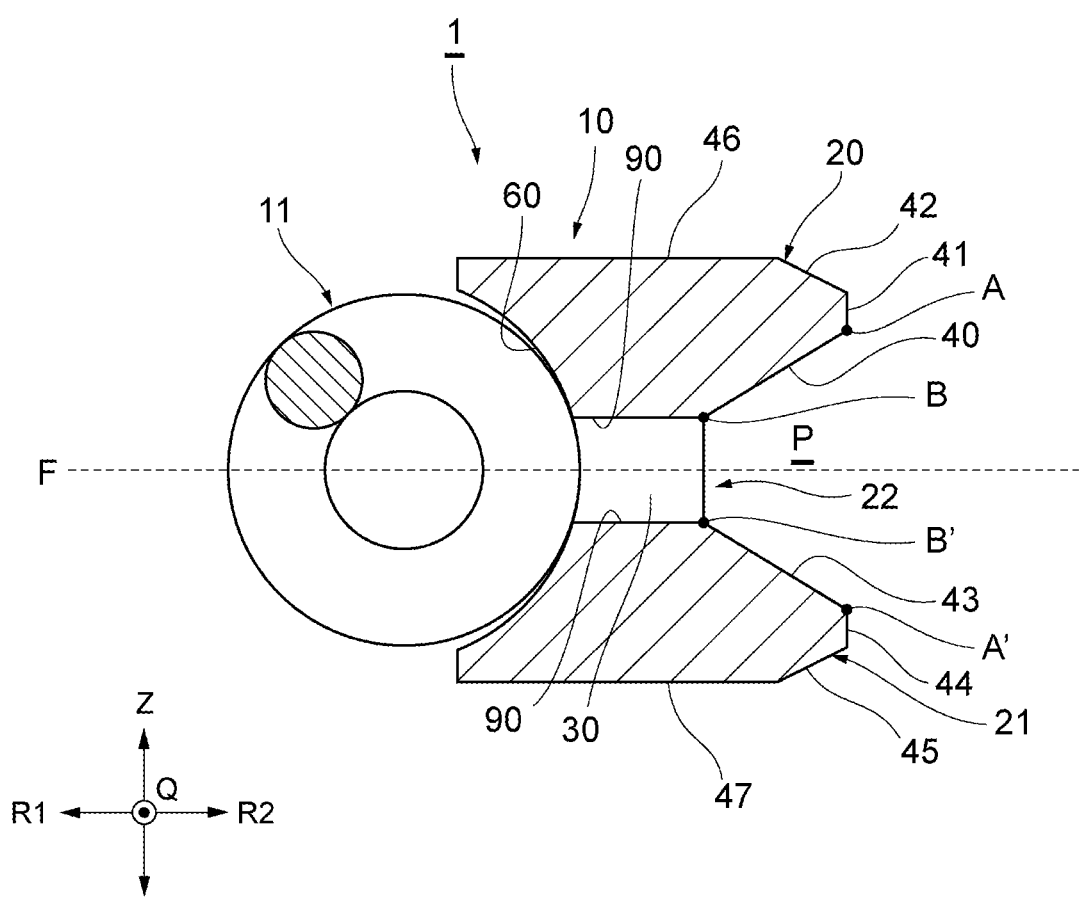
FIG. 6 is an axial cross-sectional view of the largest opening portion of the window hole in the axial direction of the oil control ring in a situation where no non-window hole part exists and an inner surface of a land portion on the combustion chamber side is directly connected to an opening end of a window hole on the combustion chamber side.

The non-window hole part 50 may not exist (the length L1 thereof may be zero) and, in such case, the inner surface 40 of the land part 20 is directly connected to the opening end B of the window hole 30 as shown in FIG. 6.

Next, in the axial cross-sectional view of the oil ring 10 shown in FIG. 5, the lower end of the outer circumferential sliding surface 41 of the upper land part 20 is referred to as point A, the window hole 30-side end of the non-window hole part 50 in the upper part of the outer circumferential surface of the web part 22 is referred to as point B, and the end of the non-window hole part 50 which is located on the side of the inner surface 40 of the land part 20 in the upper part of the outer circumferential surface of the web part 22 is referred to as point C. At this time, the distance AB between the points A and B, the distance AC between the points A and C, and the distance BC between the points B and C satisfy the following condition:

$$1.0 \leq (\text{distance } AC + \text{distance } BC)/(\text{distance } AB) \leq 1.5$$

Figure 7:
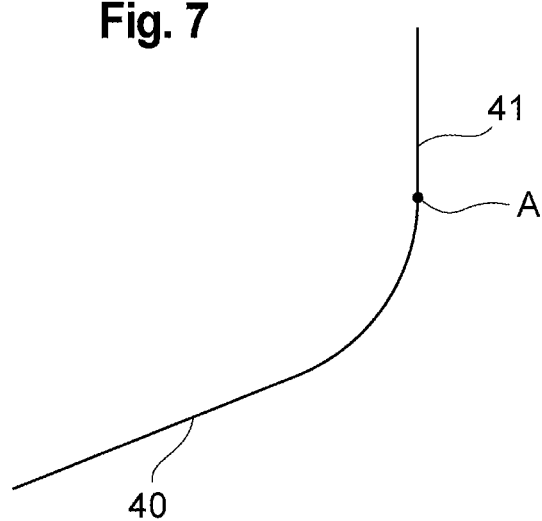
FIG. 7 is an illustration showing points A, B and C in a situation where there is an end of a curved portion.
Figure 7:
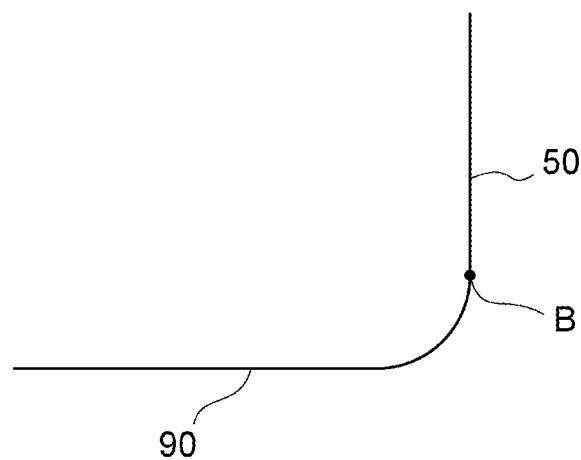
Figure 7:
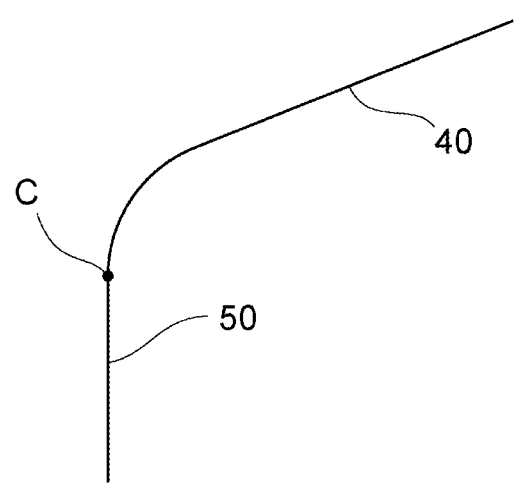

More specifically, the cylinder-side end of the inner surface 40 of the land part 20 may be curved as shown in FIG. 7(a). In such case, the crank case-side end point of the outer circumferential sliding surface 41 (which is the portion closest to the cylinder in the outer circumferential surface of the land part 20), i.e., the end point at which the curve of the inner surface 40 of the land part 20 ends and continues to the outer circumferential sliding surface 41, serves as the point A. It should be noted that the cylinder-side end of the inner surface 40 of the land part 20 may alternatively be recessed or stepped. An end (opening end) of a hole inner surface 90 of the window hole 30 of the web part 22 may be curved as shown in FIG. 7(b). In such case, an end point at which the curve of the hole inner surface 90 of the window hole 30 of the web part 22 ends and continues to the non-window hole part 50, serves as the point B. A proximal end of the inner surface 40 of the land part 20 may be curved as shown in FIG. 7(c). In such case, an end point at which the curve of the inner surface 40 of the land part 20 ends and continues to the non-window hole part 50, serves as the point C. It should be noted that the proximal end of the inner surface 40 of the land part 20 may alternatively be recessed or stepped.

The ratio (distance AC+distance BC)/(distance AB) is also referred to as an "AB ratio." Since there may be a case in which the inner surface 40 is curved or folded or the inner surface 40 has recesses and projections or a stepped portion, the distance AC refers to the length of a line connecting the points A and C. Since there may be a case in which the non-window hole part 50 is curved or folded or the non-window hole part 50 has recesses and projections or a stepped portion, the distance BC refers to the length of a line connecting the points B and C.

The AB ratio is preferably 1.35 or less, and more preferably 1.25 or less.

In the axial cross-sectional view of the oil ring 10 shown in FIG. 5, the AB ratio, the length L1 (mm) of the non-window hole part 50, a distance (land distance) L4 (mm) between the point A of the land part 20 and the point A' of the land part 21 satisfy the following condition:

$$0.6(\text{mm}^2) > L1 \times AB \text{ ratio} \times L4$$

The L1 X1×AB ratio×L4 is preferably 0.4 or less, and more preferably 0.3 or less and 0 or more.

In the axial cross-sectional view of the oil ring 10, the area S1 of a triangle formed by the points A, B and C is 11% or less and 0% or more of the area (land space area) S2 of the land space P formed by the pair of land parts 20, 21 and the web part 22 on the outer circumferential surface in the radial direction R of the oil ring 10. The land space area S2 is the area of a substantially trapezoidal shape formed by connecting four points, i.e., the points A and C of the upper land part 20 and the points A' and C' of the lower land part 21.

The area S1 of the triangle is preferably 10% or less, and more preferably 5% or less and 0% or more, of the land space area S2.

In the axial cross-sectional view of the oil ring 10, the width L2 of the web part 22 and the length L1 of the non-window hole part 50 satisfy the following condition:

$$0.27 \geq L1/L2$$

The value of L1/L2 is preferably 0.20 or less, and more preferably 0.10 or less and 0 or more.

In the axial cross-sectional view of the oil ring 10, the width L2 of the web part 22 and the width L3 of the window hole 30 satisfy the following condition:

$$L3/L2 \geq 0.46$$

The value of L3/L2 is preferably 0.50 or more, and more preferably 0.60 or more and 1.0 or less.

In the axial cross-sectional view of the oil ring 10, an angle α formed by a virtual line E passing the outer circumferential-side end A in the radial direction R of the inner surface 40 of the combustion chamber-side land part 20 and the combustion chamber-side opening end B of the window hole 30 with respect to the outer circumferential side R2 of the radial direction of the oil ring 10 (an extended line that extends in the radial direction and passes the upper opening end B of the window hole 30) (radial AB angle) is 33 degrees or less.

The angle α is preferably 27 degrees or more and 10 degrees or less.

Although the above description describes conditions that should be satisfied by the dimensions in the upper (combustion chamber side) part of the outer circumferential surface in the radial direction R of the oil ring 10, the dimensions in the lower (crank case-side) part thereof may also satisfy similar conditions. More specifically, the length L'1 of the lower non-window hole part 51 may satisfy the condition of 0.15>L'1/H1≥0. The non-window hole part 51 may not exist (the length L'1 may be zero) and, in such case, the inner surface 43 of the land part 21 may be directly connected to the opening end B' of the window hole 30 as shown in FIG. 6.

Regarding the upper end A' of the outer circumferential sliding surface 44 of the lower land part 21, the window hole 30-side end B' of the lower non-window hole part 51 in the outer circumferential surface of the web part 22, and the end C' of the lower non-window hole part 51, which is located on the side of the inner surface 43 of the land part 21, in the outer circumference surface of the web part 22, the distance A'B' between the points A' and B', the distance A'C' between the points A' and C', and the distance B'C' between the points B' and C' may satisfy the condition of 1.0≤(distance A'C'+ distance B'C')/(distance A'B')≤1.5. In addition, the following condition may also be satisfied: 0.6 (mm$^2$)>L'1×A'B' ratio× L4.

In the axial cross-sectional view of the oil ring 10 in FIG. 5, the area S'1 of a triangle formed by the points A', B' and C' may be 11% or less and 0% or more of a land space area S2 formed by the land parts 20, 21 and the web part 22 on the outer circumferential surface in the radial direction R of the oil ring 10.

In addition, in the axial cross-sectional view of the oil ring 10, the width L2 of the web part 22 and the length L'1 of the non-window hole part 51 may satisfy the condition of 0.27≥L'1/L2.

In the axial cross-sectional view of the oil ring 10, an angle α' formed by a virtual line E' passing the upper end A' of the outer circumferential sliding surface 44 of the lower land part 21 and the window hole 30-side end B' of the lower non-window hole part 51 in the outer circumferential surface of the web part 22 with respect to the outer circumferential side R2 of the radial direction of the oil ring 10 (an extended line that extends in the radial direction and passes the lower opening end B' of the window hole 30) (radial A'B' angle) may be 33 degrees or less. The dimensions on the crank case side may not satisfy the above conditions.

In the present embodiment, the width H1 of the oil ring 10 and the length L1 of the combustion chamber-side non-window hole part 50, which excludes the window hole 30, in the outer circumferential surface of the web part 22, satisfy the condition of 0.15>L1/H1≥0. In such case, the length L1 of the non-window hole part 50 becomes relatively short, which allows the engine oil to be smoothly discharged from the land space P on the outer circumferential surface of the oil ring 1 through the window holes 30, and therefore inhibits the engine oil from stagnating in the land space P. As a result, it is possible to inhibit deposits from accumulating in the cylinder-side land space P of the oil ring 10. This is partly because, as a result of making the length L1 of the non-window hole part 50 relatively short, a swirl flow of the engine oil that has been scraped off by the outer circumferential sliding surface 41 decreases in the land space P, which causes the engine oil in the land space P to be rapidly discharged along the inner surface 40 of the land part 20 and through the window hole 30.

In particular, in a configuration where the non-window hole part 50 does not substantially exist and the length L1 of the non-window hole part 50 is zero, the engine oil in the land space P can be discharged through the window holes 30 quite rapidly, which makes it possible to further inhibit the accumulation of deposits.

In the present embodiment, the AB ratio satisfies the condition of 1.0≤AB ratio≤1.5. In such case, the distance between the crank case-side end A of the outer circumferential sliding surface 41 of the land part 20 and the window-hole 30-side end B of the combustion chamber-side non-window hole part 50 of the outer circumferential surface of the web part 22 becomes relatively short, which allows the engine oil to be rapidly discharged from the land space P through the window holes 30 and inhibits the engine oil from stagnating in the land space P. As a result, it is possible to inhibit deposits from accumulating in the cylinder-side land space P of the oil ring 10. This is partly because, as a result of making the distance between the end A of the outer circumferential sliding surface 41 of the land part 20 and the window hole 30-side end B of the non-window hole part 50 relatively short, a swirl flow of engine oil that has been scraped off by the outer circumferential sliding surface 41 decreases in the land space P, which causes the engine oil in the land space P to be efficiently discharged through the window hole 30.

The AB ratio, the length L1 of the non-window hole part 50 and the distance L4 (land distance) between the points A and A' of the land parts 20, 21 satisfy the condition of 0.6 (mm$^2$)>L1×AB ratio×L4. In such case, the length L1 of the non-window hole part 50 becomes relatively short, which causes the distance between the end A of the outer circumferential sliding surface 41 of the land part 20 and the window hole 30-side end B of the non-window hole part 50 to become relatively short and further causes the land distance L4 to become short; as a result, the engine oil in the land space P is rapidly discharged through the window holes 30, which inhibits the engine oil from stagnating in the land space P. As a result, it is possible to inhibit deposits from accumulating in the land space P on the outer circumferential surface of the oil ring 10.

In the axial cross-sectional view of the oil ring 10, the area S1 of the triangle formed by the points A, B and C is 11% or less and 0% or more of the land space area S2. In such case, the area S1 of the triangle relatively decreases, which allows the engine oil to be rapidly discharged from the land space P through the window holes 30, thereby inhibiting the engine oil from stagnating in the land space P. As a result, it is possible to inhibit deposits from accumulating in the land space P on the outer circumferential surface of the oil ring 10. This is partly because, as a result of making the area S1 of the triangle relatively small, a stagnation region formed by the inner surface 40 of the land space 20 and the non-window hole part 50 of the web part 22 decreases, which allows the engine oil in the land space P to be efficiently discharged through the window hole 30.

In the axial cross-sectional view of the oil ring 10, the width L2 of the web part 22 and the length L1 of the non-window hole part 50 satisfy the condition of 0.27≥L1/L2. In such case, the length L1 of the non-window hole part 50 becomes relatively short, which allows the engine oil to be rapidly discharged from the land space P through window holes 30, thereby inhibiting the engine oil from stagnating in the land space P. As a result, it is possible to inhibit deposits from accumulating in the land space P on the outer circumferential surface of the oil ring 10. This is partly because, as a result of making the length L1 of the non-window hole part 50 relatively short, it becomes possible for the engine oil to be discharged more easily along the inner surface 40 of the land part 20 and through the window holes 30.

In the axial cross-sectional view of the oil ring 10, the width L2 in the sliding direction Z of the web part 22 and the width L3 in the sliding direction Z of the window hole 30 satisfy the condition of L3/L2>0.46. In such case, the width L3 of the window hole 30 becomes relatively long, which allows the engine oil to be rapidly discharged from the land space P through the window holes 30, thereby inhibiting the engine oil from stagnating in the land space P. As a result, it is possible to inhibit deposits from accumulating in the land space P on the outer circumferential surface of the oil ring 10. This is partly because, as a result of making the width L3 of the window hole 30 relatively long, it becomes possible for the engine oil to be discharged more easily through the window holes 30.

In the axial cross-sectional view of the oil ring 10, the angle α formed by the virtual line E passing the outer circumferential-side end A in the radial direction R of the inner surface 40 of the land part 20 and the combustion chamber-side opening end B of the window hole 30 with respect to the outer circumferential side R2 of the radial direction of the oil ring 10 is 33 degrees or less. In such case, the rising angle of the inner surface 40 of the land part 20 becomes small, which allows the engine oil to be rapidly discharged through the window holes 30. As a result, it is possible to inhibit deposits from accumulating in the land space P on a side surface of the oil ring 10.

Although preferred embodiments of the present invention have been described above with reference to the attached drawings, the present invention is not limited to such examples. A person skilled in the art would obviously be able to conceive of various types of alteration and modification examples within the scope of the idea set forth in the scope of the claims, and it is understood that such alteration and modification examples obviously belong to the technical scope of the present invention.

Figure 8:
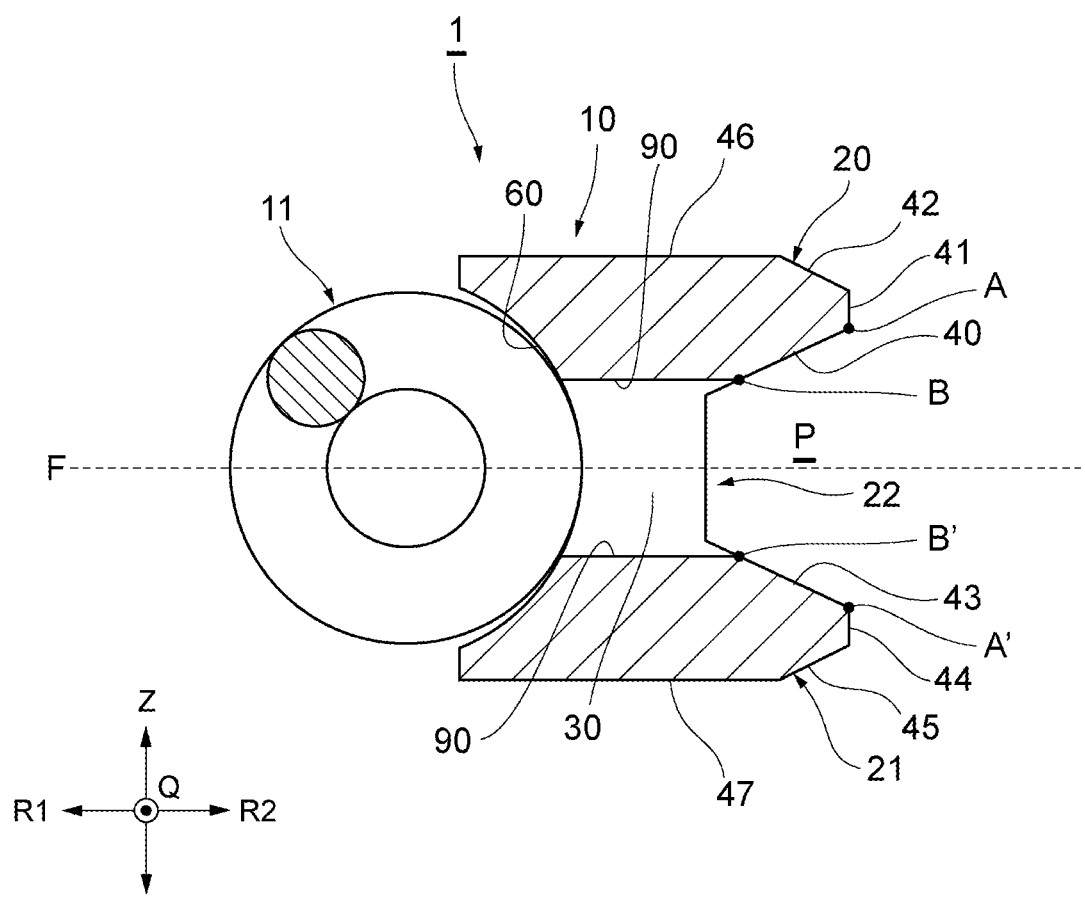
FIG. 8 is an axial cross-sectional view of the largest opening portion of the window hole in the axial direction of the oil control ring in a situation where a window hole extends over the web part and the land parts.

For example, in the above embodiments, the window hole 30 may extend across the web part 22 and the land parts 20, 21 as shown in FIG. 8, instead of only extending within the web part 22. In such example, the non-window hole parts 50, 51 will not exist. The window hole 30 may be configured such that its hole diameter increases outward in the radial direction R or decreases outward in the radial direction R. The window hole 30 does not have to be located at the center in the sliding direction Z of the oil ring 10, and its center may alternatively be shifted toward the combustion chamber side or the crank case side. The shape of the inner surfaces 40, 43 is not particularly limited and, in the cross-sectional view in the axial direction Z at the window hole 30 of the oil ring 10, the inner surfaces 40, 43 may form, for example, a curve such as a curve bulging upward, a curve recessed downward or a curve which curves upward and downward like a waveform, a folded line constituted by a plurality of straight lines, etc. The inner surfaces 40, 43 may have protrusions and recesses or steps in a portion thereof. The inner surfaces 40, 43 of the land parts 20, 21 may have a roughness Ra of 1.5 μm (ISO 13565) or less. The shape of the outer circumferential sliding surfaces 41, 44 is not particularly limited and, in the cross-sectional view in the axial direction Z at the window hole 30 of the oil ring 10, the outer circumferential sliding surfaces 41, 44 may each be a curved surface protruding outward in the radial direction R or may have protrusions and recesses or steps in a portion thereof. The chamfered surfaces 42, 45 may not exist. The non-window hole parts 50, 51 are not limited to flat surfaces, and they may be curved. The shape of the upper and lower (combustion chamber-side and crank case-side) inner surfaces 40, 43 of the land parts 20, 21 may not be symmetric to each other.

EXAMPLES

The Examples of the present invention will now be described below. It should be noted that the present invention is not limited to the Examples below.

A computation fluid dynamics (CFD) analysis using a computer was used to analyze a flow of engine oil for oil control rings of various dimensions and calculate an engine oil discharge capacity at a window hole. In this analysis, a VOF (Volume of Fluid) analysis for a gas-liquid two-phase flow was performed using commercially available software. Various dimensions and the engine oil discharge capacity in each of Examples 1-5, Comparative Examples 1-3 and a Base Example are shown in the table of FIG. 9. The engine oil discharge capacity refers to a ratio of an amount of engine oil discharged from the window holes in each of the Examples and the Comparative Examples, with respect to the amount of engine oil discharged from the window holes in the Base Example which serves as a criterion for the conventional oil control rings.

Example 1

The major dimensions of an oil control ring of Example 1 are as set forth below.
L1/H1: 0.02
AB ratio: 1.04
Triangle area S1/land space area S2: 2.2%
L1/L2: 0.07
L3/L2: 1.00
L1×AB ratio×L4: 0.01 (mm$^2$)
AB angle α in radial direction: 20.0 degrees.

In the oil control ring of Example 1, the value of L1/H1 was 0.02, which satisfied the condition of 0.15>L1/H1. The AB ratio was 1.04, which satisfied the condition of 1.0≤AB ratio≤1.5. The triangle area S1/land space area S2 was 2.2%, which was 11% or less. The value of L1/L2 was 0.07, which satisfied the condition of 0.27≥L1/L2. The value of L3/L2 was 1.00, which satisfied the condition of L3/L2≥0.46. The L1×AB ratio×L4 was 0.01, which satisfied the condition of 0.6 (mm$^2$)>L1×AB ratio×L4. The AB angle α in the radial direction was 20.0 degrees, which satisfied the condition of angle α being 33 degrees or less.

The engine oil discharge capacity was 1.9, which was much higher than that of the Base Example which serves as a criterion for inhibiting deposits.

Example 2

The major dimensions of an oil control ring of Example 2 are as set forth below.
L1/H1: 0.08
AB ratio: 1.23
Triangle area S1/land space area S2: 7.9%
L1/L2: 0.20
L3/L2: 0.61
L1×AB ratio×L4: 0.24 (mm$^2$)
AB angle α in radial direction: 23.2 degrees.

In the oil control ring of Example 2, the value of L1/H1 was 0.08, which satisfied the condition of 0.15>L1/H1. The AB ratio was 1.23, which satisfied the condition of 1.0≤AB ratio≤1.5. The triangle area S1/land space area S2 was 7.9%, which was 11% or less. The value of L1/L2 was 0.20, which satisfied the condition of 0.27≥L1/L2. The value of L3/L2 was 0.61, which satisfied the condition of L3/L2≥0.46. The L1×AB ratio×L4 was 0.24, which satisfied the condition of 0.6 (mm$^2$)>L1×AB ratio×L4. The AB angle α in the radial direction was 20.0 degrees, which satisfied the condition of angle α being 33 degrees or less.

The engine oil discharge capacity was 1.4, which was much higher than that of the Base Example which serves as a criterion for inhibiting deposits.

Example 3

The major dimensions of an oil control ring of Example 3 are as set forth below.
L1/H1: 0.12
AB ratio: 1.47
Triangle area S1/land space area S2: 10.5%
L1/L2: 0.25
L3/L2: 0.51
L1×AB ratio×L4: 0.48 (mm$^2$)
AB angle α in radial direction: 31.6 degrees.

In the oil control ring of Example 3, the value of L1/H1 was 0.12, which satisfied the condition of 0.15>L1/H1. The AB ratio was 1.47, which satisfied the condition of 1.0≤AB ratio≤1.5. The triangle area S1/land space area S2 was 10.5%, which was 11% or less. The value of L1/L2 was 0.25, which satisfied the condition of 0.27≥L1/L2. The value of L3/L2 was 0.51, which satisfied the condition of L3/L2≥0.46. The L1×AB ratio×L4 was 0.48, which satisfied the condition of 0.6 (mm$^2$)>L1×AB ratio×L4. The AB angle α in the radial direction was 31.6 degrees, which satisfied the condition of angle α being 33 degrees or less.

The engine oil discharge capacity was 1.2, which was higher than that of the Base Example which serves as a criterion for inhibiting deposits.

Example 4

The major dimensions of an oil control ring of Example 4 are as set forth below.
L1/H1: 0.12
AB ratio: 1.25
Triangle area S1/land space area S2: 10.6%
L1/L2: 0.27
L3/L2: 0.46
L1×AB ratio×L4: 0.40 (mm$^2$)
AB angle α in radial direction: 26.9 degrees.

In the oil control ring of Example 4, the value of L1/H1 was 0.12, which satisfied the condition of 0.15>L1/H1. The AB ratio was 1.25, which satisfied the condition of 1.0≤AB ratio≤1.5. The triangle area S1/land space area S2 was 10.6%, which was 11% or less. The value of L1/L2 was 0.27, which satisfied the condition of 0.27≥L1/L2. The value of L3/L2 was 0.46, which satisfied the condition of L3/L2≥0.46. The L1×AB ratio×L4 was 0.40, which satisfied the condition of 0.6 (mm$^2$)>L1×AB ratio×L4. The AB angle α in the radial direction was 26.9 degrees, which satisfied the condition of angle α being 33 degrees or less.

The engine oil discharge capacity was 1.1, which was higher than that of the Base Example which serves as a criterion for inhibiting deposits.

Example 5

The major dimensions of an oil control ring of Example 5 are as set forth below.
L1/H1: 0.13
AB ratio: 1.35
Triangle area S1/land space area S2: 10.2%
L1/L2: 0.23
L3/L2: 0.55
L1×AB ratio×L4: 0.46 (mm$^2$)
AB angle α in radial direction: 23.1 degrees.

In the oil control ring of Example 5, the value of L1/H1 was 0.13, which satisfied the condition of 0.15>L1/H1. The AB ratio was 1.35, which satisfied the condition of 1.0≤AB ratio≤1.5. The triangle area S1/land space area S2 was 10.2%, which was 11% or less. The value of L1/L2 was 0.23, which satisfied the condition of 0.27≥L1/L2. The value of L3/L2 was 0.55, which satisfied the condition of L3/L2≥0.46. The L1×AB ratio×L4 was 0.46, which satisfied the condition of 0.6 (mm$^2$)>L1×AB ratio×L4. The AB angle α in the radial direction was 23.1 degrees, which satisfied the condition of angle α being 33 degrees or less.

The engine oil discharge capacity was 1.1, which was higher than that of the Base Example which serves as a criterion for inhibiting deposits.

Base Example

The Base Example is a conventional oil control ring, which serves as a criterion for judging the engine oil discharge capacity.

The major dimensions of an oil control ring of the Base Example are as set forth below.
L1/H1: 0.18
AB ratio: 1.49
Triangle area S1/land space area S2: 14.3%
L1/L2: 0.32
L3/L2: 0.36
L1×AB ratio×L4: 0.71 (mm$^2$)
AB angle α in radial direction: 27.8 degrees.

In the oil control ring of the Base Example, the value of L1/H1 was 0.18, which did not satisfy the condition of 0.15>L1/H1. The AB ratio was 1.49, which satisfied the condition of 1.0≤AB ratio≤1.5. The triangle area S1/land space area S2 was 14.3%, which exceeded 11%. The value of L1/L2 was 0.32, which did not satisfy the condition of 0.27≥L1/L2. The value of L3/L2 was 0.36, which did not satisfy the condition of L3/L2≥0.46. The L1×AB ratio×L4 was 0.71, which did not satisfy the condition of 0.6 (mm$^2$)>L1×AB ratio×L4. The AB angle α in the radial direction was 27.8 degrees, which satisfied the condition of angle α being 33 degrees or less.

Comparative Example 1

The major dimensions of an oil control ring of Comparative Example 1 are as set forth below.
L1/H1: 0.16
AB ratio: 1.60
Triangle area S1/land space area S2: 11.5%
L1/L2: 0.26
L3/L2: 0.49
L1×AB ratio×L4: 0.76 (mm$^2$)
AB angle α in radial direction: 30.5 degrees.

In the oil control ring of Comparative Example 1, the value of L1/H1 was 0.16, which did not satisfy the condition of 0.15>L1/H1. The AB ratio was 1.60, which did not satisfy the condition of 1.0≤AB ratio≤1.5. The triangle area S1/land space area S2 was 11.5%, which exceeded 11%. The L1×AB ratio×L4 was 0.76, which did not satisfy the condition of 0.6 (mm$^2$)>L1×AB ratio×L4.

The engine oil discharge capacity was 1.0, which was equal to that of the Base Example which serves as a criterion for inhibiting deposits.

Comparative Example 2

The major dimensions of an oil control ring of Comparative Example 2 are as set forth below.
L1/H1: 0.15
AB ratio: 1.41
Triangle area S1/land space area S2: 11.9%
L1/L2: 0.30
L3/L2: 0.40
L1×AB ratio×L4: 0.62 (mm$^2$)
AB angle α in radial direction: 33.6 degrees.

In the oil control ring of Comparative Example 2, the value of L1/H1 was 0.15, which did not satisfy the condition of 0.15>L1/H1. The triangle area S1/land space area S2 was 11.9%, which exceeded 11%. The value of L1/L2 was 0.30, which did not satisfy the condition of 0.27≥L1/L2. The value of L3/L2 was 0.40, which did not satisfy the condition of L3/L2≥0.46. The L1×AB ratio×L4 was 0.62, which did not satisfy the condition of 0.6 (mm$^2$)>L1×AB ratio×L4. The AB angle α in the radial direction was 33.6 degrees, which did not satisfy the condition of angle α being 33 degrees or less.

The engine oil discharge capacity was 1.00, which was equal to that of the Base Example which serves as a criterion for inhibiting deposits.

Comparative Example 3

The major dimensions of an oil control ring of Comparative Example 3 are as set forth below.
L1/H1: 0.17
AB ratio: 1.38
Triangle area S1/land space area S2: 12.7%
L1/L2: 0.29
L3/L2: 0.42
L1×AB ratio×L4: 0.70 (mm$^2$)
AB angle α in radial direction: 27.3 degrees.

In the oil control ring of Comparative Example 3, the value of L1/H1 was 0.17, which did not satisfy the condition of 0.15>L1/H1. The triangle area S1/land space area S2 was 12.7%, which exceeded 11%. The value of L1/L2 was 0.29, which did not satisfy the condition of 0.27≥L1/L2. The value of L3/L2 was 0.42, which did not satisfy the condition of L3/L2≥0.46. The L1×AB ratio×L4 was 0.70, which did not satisfy the condition of 0.6 (mm$^2$)>L1×AB ratio×L4.

The engine oil discharge capacity was 0.9, which was less than that of the Base Example which serves as a criterion for inhibiting deposits.

Figure 10:
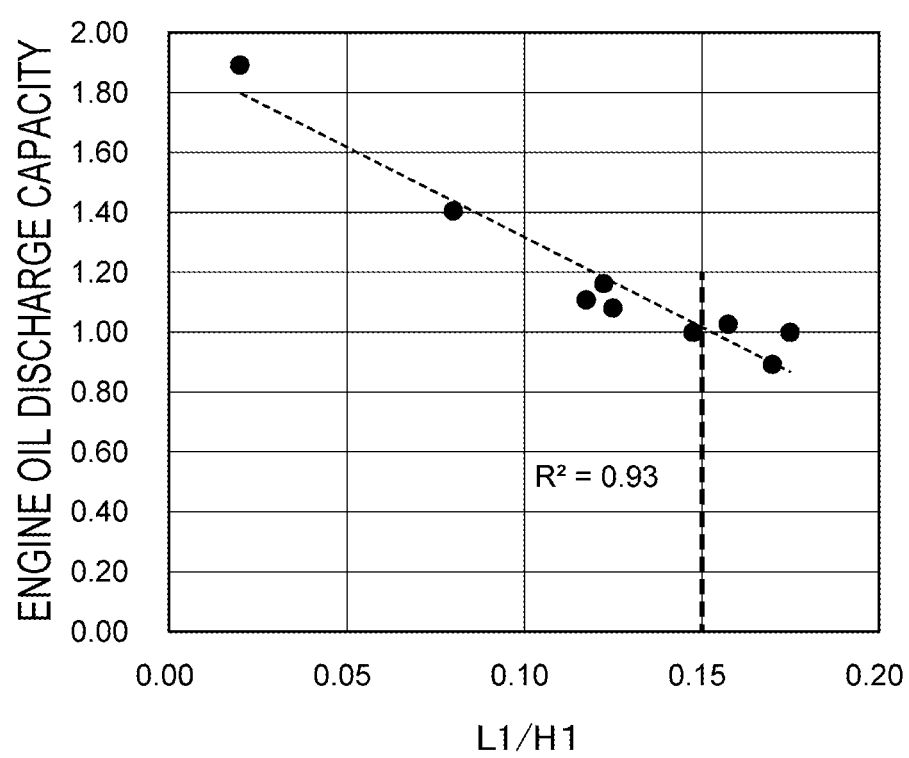
FIG. 10 is a graph showing a correlation between L1/H1 and the engine oil discharge capacity in the Examples, the Comparative Examples and a Base Example.
Figure 11:
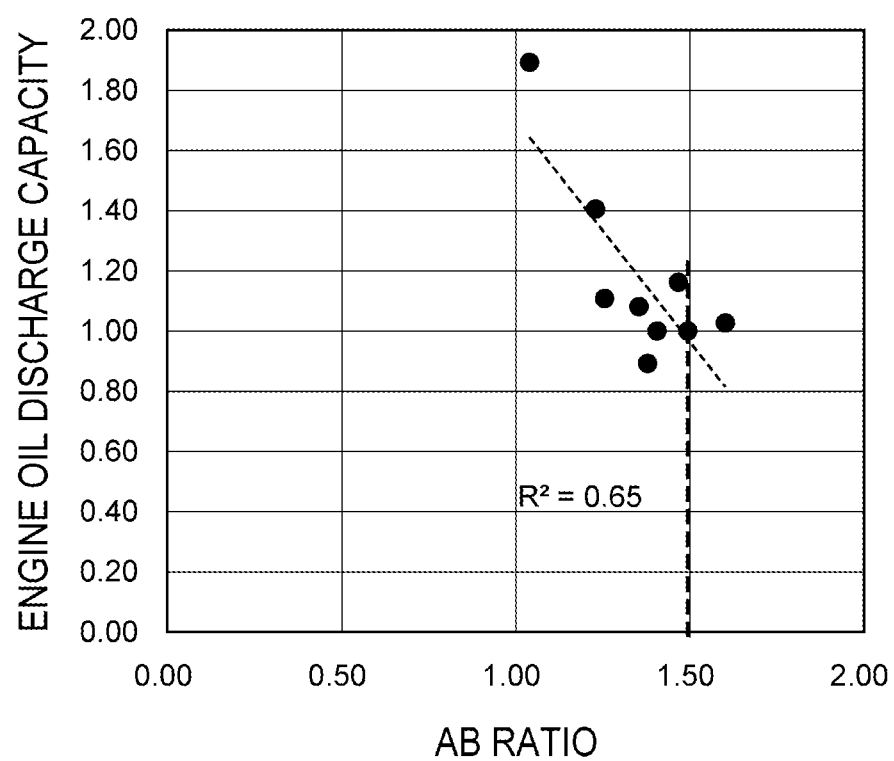
FIG. 11 is a graph showing a correlation between an AB ratio and the engine oil discharge capacity in the Examples, the Comparative Examples and a Base Example.
Figure 12:
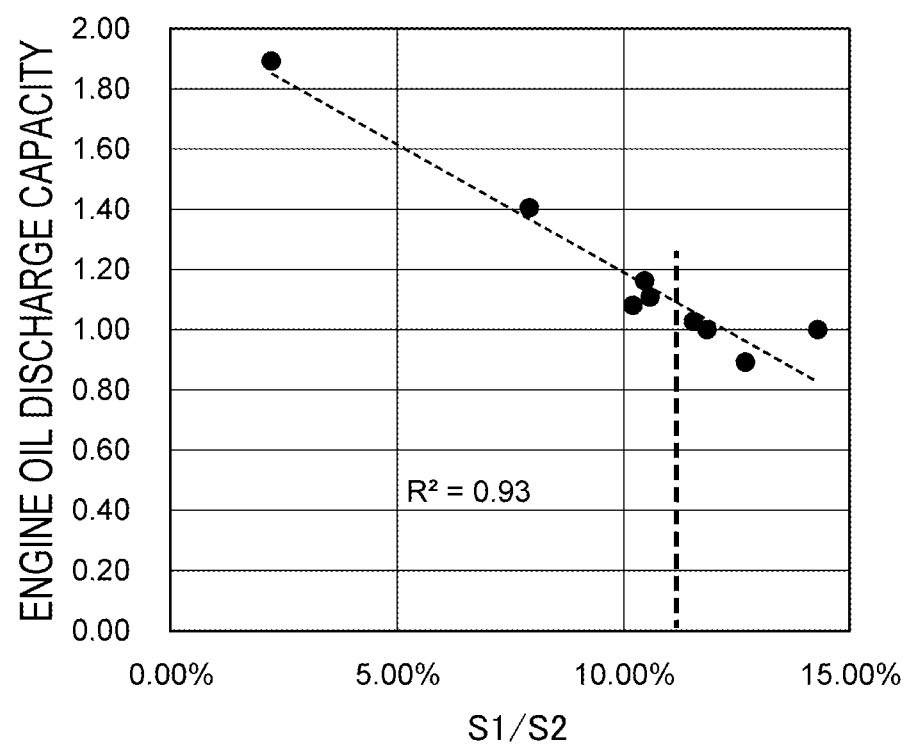
FIG. 12 is a graph showing a correlation between a triangle area S1/land space area S2 and the engine oil discharge capacity in the Examples, the Comparative Examples and a Base Example.
Figure 13:
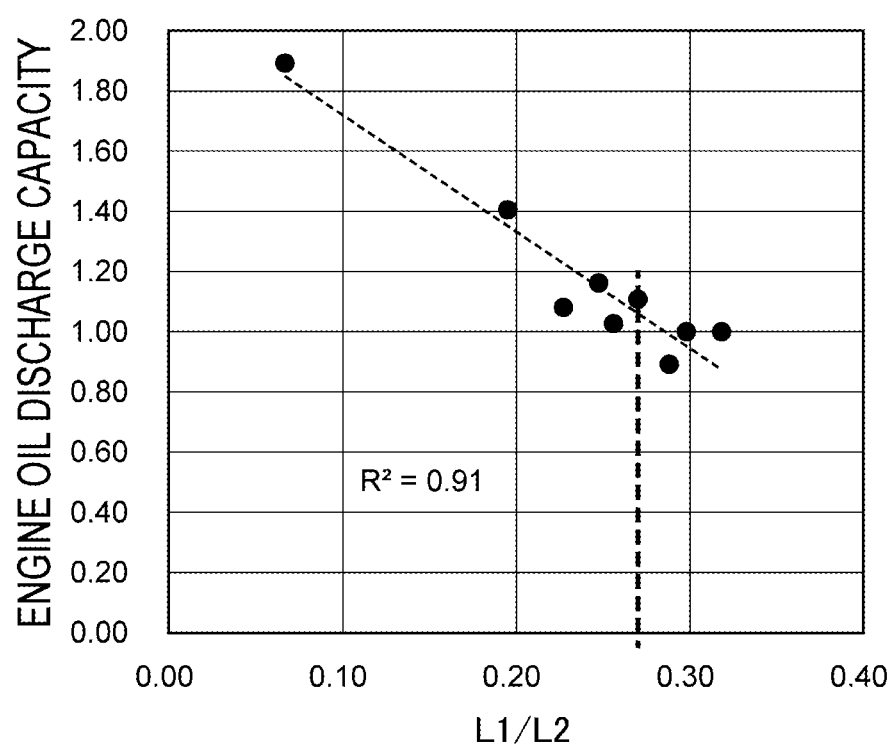
FIG. 13 is a graph showing a correlation between L1/L2 and the engine oil discharge capacity in the Examples, the Comparative Examples and a Base Example.
Figure 14:
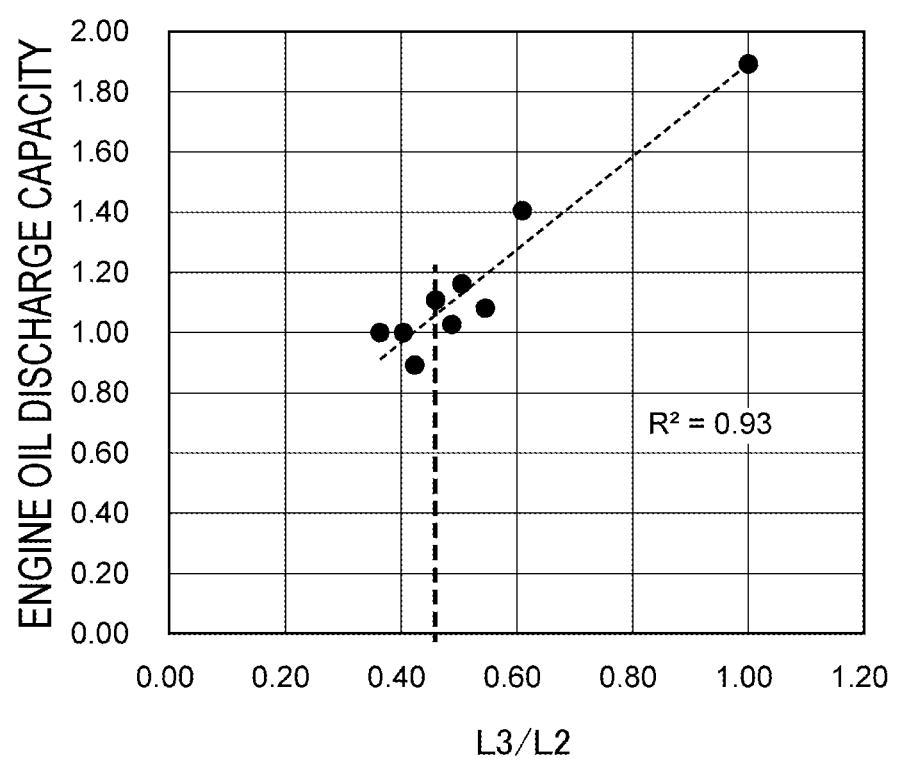
FIG. 14 is a graph showing a correlation between L3/L2 and the engine oil discharge capacity in the Examples, the Comparative Examples and a Base Example.
Figure 15:
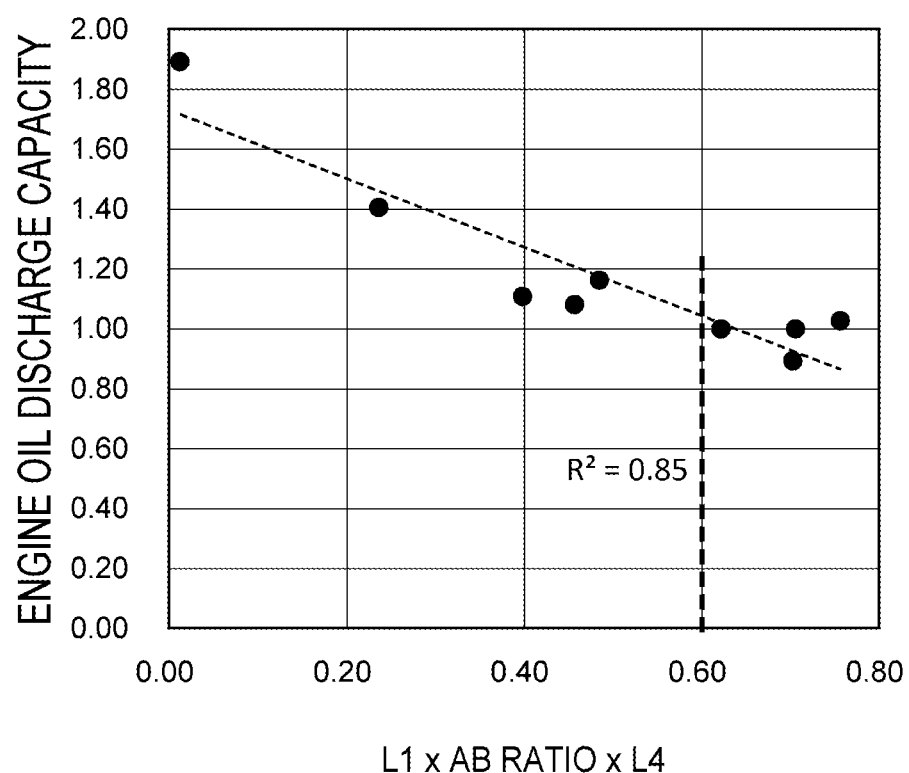
FIG. 15 is a graph showing a correlation between L1×AB ratio×L4 and the engine oil discharge capacity in the Examples, the Comparative Examples and a Base Example.

Graphs showing correlations between the various dimensions and the engine oil discharge capacity were prepared based on the analysis results set forth above. FIG. 10 is a graph showing a correlation between the value of L1/H1 and the engine oil discharge capacity. FIG. 11 is a graph showing a correlation between the AB ratio and the engine oil discharge capacity. FIG. 12 is a graph showing a correlation between the triangle area S1/land space area S2 and the engine oil discharge capacity. FIG. 13 is a graph showing a correlation between the value of L1/L2 and the engine oil discharge capacity. FIG. 14 is a graph showing a correlation between the value of L3/L2 and the engine oil discharge capacity. FIG. 15 is a graph showing a correlation between the L1×AB ratio×L4 and the engine oil discharge capacity.

As shown in FIG. 10, the correlation coefficient $R^2$ between the value of L1/H1 and the engine oil discharge capacity is about 0.93, from which it can be confirmed that the engine oil discharge capacity can be increased and the stagnation of engine oil can be inhibited by satisfying the condition of 0.15>L1/H1≥0.

As shown in FIG. 11, the correlation coefficient $R^2$ between the AB ratio and the engine oil discharge capacity is about 0.65, from which it can be confirmed that the engine oil discharge capacity can be increased and the stagnation of engine oil can be inhibited by satisfying the condition of 1.0≤AB ratio≤1.5.

As shown in FIG. 12, the correlation coefficient $R^2$ between the triangle area S1/land space area S2 and the engine oil discharge capacity is about 0.93, from which it can be confirmed that the engine oil discharge capacity can be increased and the stagnation of engine oil can be inhibited by configuring the triangle area S1 so as to be 11% or less of the land space area S2.

As shown in FIG. 13, the correlation coefficient $R^2$ between the value of L1/L2 and the engine oil discharge capacity is about 0.91, from which it can be confirmed that the engine oil discharge capacity can be increased and the stagnation of engine oil can be inhibited by satisfying the condition of 0.27≥L1/L2.

As shown in FIG. 14, the correlation coefficient $R^2$ between the value of L3/L2 and the engine oil discharge capacity is about 0.93, from which it can be confirmed that the engine oil discharge capacity can be increased and the stagnation of engine oil can be inhibited by satisfying the condition of L3/L2≥0.46.

As shown in FIG. 15, the correlation coefficient $R^2$ between the L1 (mm)×AB ratio×L4 (mm) and the engine oil discharge capacity is about 0.85, from which it can be confirmed that the engine oil discharge capacity can be increased and the stagnation of engine oil can be inhibited by satisfying the condition of 0.6 (mm$^2$)>L1×AB ratio×L4.

Figure 16:
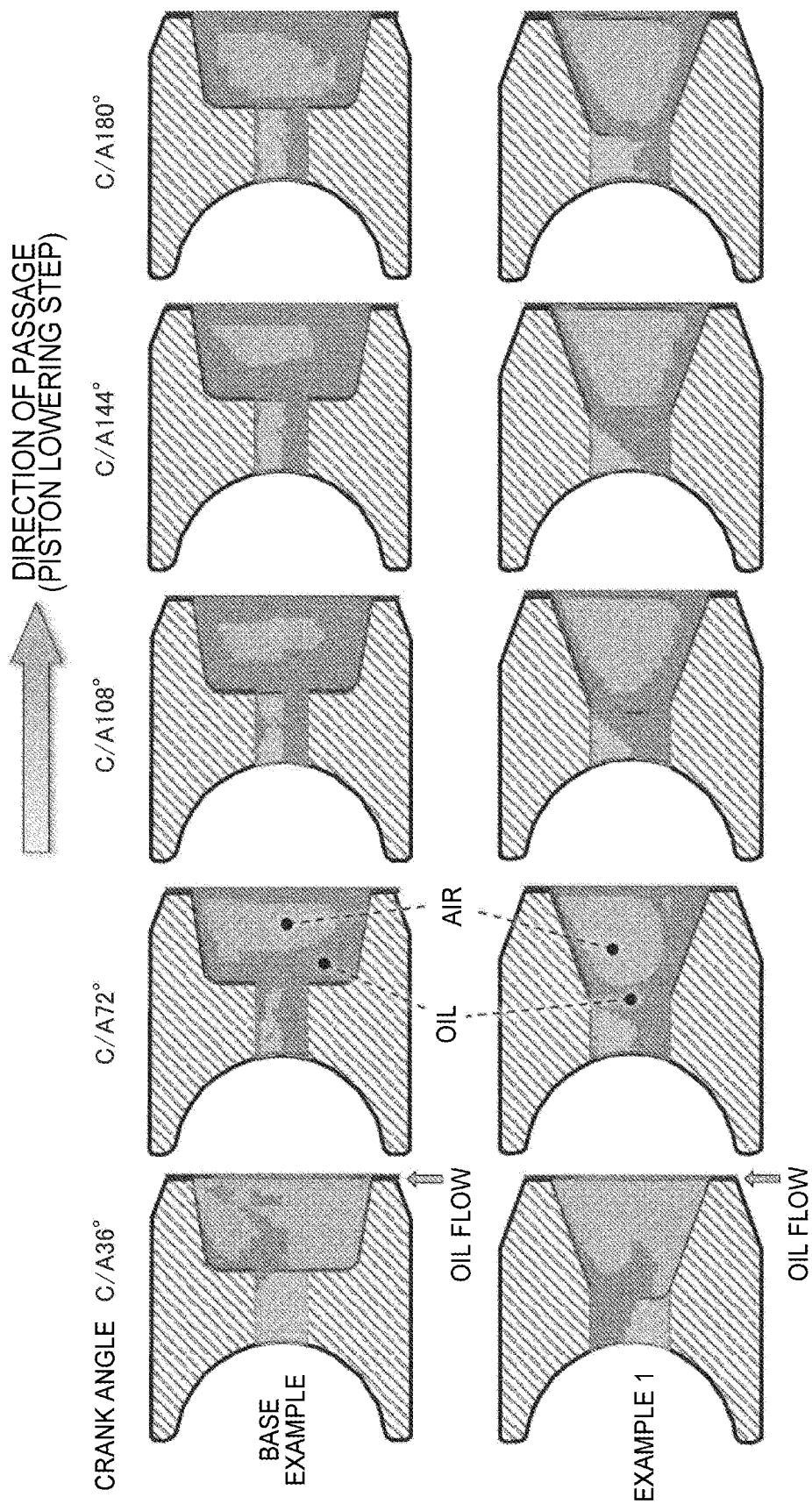
FIG. 16 is a diagram showing a flow of an engine oil in Example 1 and the Base Example in analysis.

FIG. 16 shows a flow of an engine oil for each crank angle in a piston lowering step, which was computed in the above-described analysis, in Example 1 and the Base Example. It can be confirmed that the engine oil flowed through the window holes without stagnating in Example 1, whereas it can be confirmed that the engine oil stagnated, with respect to Example 1, in the Base Example.

INDUSTRIAL APPLICABILITY

The present invention is useful in inhibiting an engine oil from stagnating in a cylinder-side land space of an oil ring and thus inhibiting deposits from accumulating therein in an oil control ring.

REFERENCE SIGNS LIST

1: oil control ring
10: oil ring
11: coil expander
20, 21: land part
22: web part
30: window hole
40, 43: inner surface
41, 44: outer circumferential sliding surface
50, 51: non-window hole part
L1, L'1: length of non-window hole part H1: width of oil ring in the sliding direction
F: center line
R: radial direction
Q: circumferential direction
Z: axial direction (sliding direction)

What is claimed is:

1. An oil control ring, comprising:

an oil ring having a pair of land parts arranged in a sliding direction and connected to each other by a web part; and a coil expander arranged on an inner circumferential side of the oil ring in a radial direction, the coil expander biasing the oil ring toward an outer circumferential side in the radial direction, wherein the web part of the oil ring is provided with a plurality of window holes along a circumferential direction, the window holes each extending through the web part in the radial direction;

wherein, in an axial cross-sectional view of a largest opening portion in an axial direction of the window hole in the oil ring, an inner surface of a combustion chamber-side land part which is located on the outer circumferential side in the radial direction of the combustion chamber-side land part and connects an outer circumferential surface in the radial direction of the web part and a sliding surface of the land part, and an inner surface of a crank case-side land part which is located on the outer circumferential side in the radial direction of the crank case-side land part and connects the outer circumferential surface in the radial direction of the web part and a sliding surface of the land part, are formed so as to increase a diameter toward the outer circumferential side in the radial direction, and wherein, in the axial cross-sectional view of the largest opening portion of the window hole in the axial direction of the oil ring, a width H1 in the sliding direction of the oil ring and a length L1 of a combustion chamber-side non-window hole part, which excludes the window hole, in the outer circumferential surface of the web part, satisfy the following condition:

0.15>L1/H1≥0, wherein, in the axial cross-sectional view of the largest opening portion of the window hole in the axial direction of the oil ring, when a crank case-side end of the sliding surface of the combustion chamber-side land part is referred to as point A, a window hole-side end of the combustion chamber-side non-window hole part in the outer circumferential surface of the web part is referred to as point B, and an end of the combustion chamber-side non-window hole part, which is located on a side of the inner surface of the land part, in the outer circumference surface of the web part is referred to as point C, a distance AB between the points A and B, a distance AC between the points A and C, and a distance BC between the points B and C, satisfy the following condition: 1.0< (distance AC+distance BC)/(distance AB)≤1.5, wherein, in the axial cross-sectional view of the largest opening portion of the window hole in the axial direction of the oil ring, an area of a triangle formed by the points A, B and C is 11% or less and greater than 0% of an area of a space formed by the pair of land parts and the web part on the outer circumferential side in the radial direction of the oil ring, and wherein, in the axial cross-sectional view of the largest opening portion of the window hole in the axial direction of the oil ring, an angle formed by a virtual line passing a crank case-side end of the sliding surface of the combustion chamber-side land part and the window hole-side end of the combustion chamber-side non-window hole part in the outer circumferential surface of the web part, with respect to the radial direction of the oil ring, is 33 degrees or less.

2. The oil control ring according to claim 1, wherein, in the axial cross-sectional view of the largest opening portion of the window hole in the axial direction of the oil ring, when a combustion chamber-side end of the sliding surface of the crank case-side land part is referred to as point A', (distance AC+distance BC)/(distance AB), the length L1 (mm) of the non-window hole part, and a distance L4 (mm) between the points A and A' of the land parts satisfy the following condition:

0.6 (mm²)>$L1 \times ((\text{distance } AC + \text{distance } BC)/(\text{distance } AB)) \times L4$.

3. The oil control ring according to claim 1, wherein, in the axial cross-sectional view of the largest opening portion of the window hole in the axial direction of the oil ring, a width L2 in the sliding direction of the web part and the length L1 of the non-window hole part satisfy the following condition:

0.27≥$L1/L2$.

4. The oil control ring according to claim 1, wherein, in the axial cross-sectional view of the largest opening portion of the window hole in the axial direction of the oil ring, a width L2 in the sliding direction of the web part and a width L3 in the sliding direction of the window hole satisfy the following condition:

$L3/L2$≥0.46.

5. The oil control ring according to claim 1, wherein the non-window hole part is a flat surface or a curved surface.

* * * * *